(12) United States Patent
Kundu et al.

(10) Patent No.: US 7,478,378 B2
(45) Date of Patent: Jan. 13, 2009

(54) SEMANTICALLY CONSISTENT ADAPTATION OF SOFTWARE APPLICATIONS

(75) Inventors: Ashish Kundu, Orissa (IN); Amit A Nanavati, New Delhi (IN); Biplav Srivastava, Noida (IN); Manish Kurhekar, Nagpur (IN)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/998,850

(22) Filed: Nov. 29, 2004

(65) Prior Publication Data

US 2006/0130028 A1    Jun. 15, 2006

(51) Int. Cl.
  *G06F 9/45* (2006.01)
  *G06F 12/00* (2006.01)
(52) U.S. Cl. ..................... 717/157; 707/200
(58) Field of Classification Search .................. None
  See application file for complete search history.

(56) References Cited

U.S. PATENT DOCUMENTS

| | | | |
|---|---|---|---|
| 5,561,803 A * | 10/1996 | Kilis | 717/159 |
| 5,634,056 A | 5/1997 | Casotto | |
| 5,860,007 A | 1/1999 | Soni et al. | |
| 5,920,725 A | 7/1999 | Ma et al. | |
| 6,446,087 B1 | 9/2002 | Lai | |
| 6,567,798 B1 | 5/2003 | Hollberg et al. | |
| 2002/0073094 A1 | 6/2002 | Becker et al. | |
| 2002/0083415 A1 | 6/2002 | Jazdzewski | |
| 2002/0184180 A1 | 12/2002 | Debique | |
| 2005/0097146 A1 * | 5/2005 | Konstantinou et al. | 707/200 |
| 2007/0156622 A1 * | 7/2007 | Akkiraju et al. | 706/48 |

OTHER PUBLICATIONS

Abiteboul, S., et al., "Update Preparation in the IFO Database Model", Foundations of Data Organization, May 21-24, 1985, p. 243-51, INSPEC Abstract No. C86028702.
Koeller, A., et al., "Incremental Maintenance of Schema—Restructuring Views", Advances in Database Technology, Computer Science, Mar. 22-27, 2002, vol. 2287, p. 354-71.
Masahiro Hori et al., "Annotation by Transformation for the Automatic Generation of Content Customization Metadata", F. Mattern and M. Naghshineh (Eds.): Pervasive 2002, LNCS 2414, pp. 267-281, 2002, Springer-Verlag, Germany.

\* cited by examiner

*Primary Examiner*—Eric B Kiss
*Assistant Examiner*—Ben C Wang
(74) *Attorney, Agent, or Firm*—Gibb & Rahman, LLC

(57) ABSTRACT

The adaptation precedence of an application (or order of adaptation of various components) is given as a directed acyclic graph (DAG), with each vertex being an atomic unit of adaptation, or a component which comprises of atomic units of adaptation. Each such component has an associated DAG specifying the order of adaptation with vertices as sub-components. Relations among sub-components and associated actions are stored as a table. The relations between sub-components of different components follow a set of constraints in order to be compatible relations. A linear order from the partial order is created as represented by the DAG and follows that order for adaptation of each component. Each component x is adapted atomically and then the table of relations is updated appropriately. As and when a component y is to be adapted, the table is looked-up and it is determined which relations and actions are to be enforced upon y while its adaptation is being executed. A new version of the application is the output at the end of the adaptation, which is semantically consistent with the given relations and actions.

3 Claims, 4 Drawing Sheets

SEMANTICALLY CONSISTENT ADAPTATION OF SOFTWARE APPLICATIONS

FIELD OF THE INVENTION

The present invention relates to the adaptation of software applications, which includes web applications and web pages.

BACKGROUND

A software application is accessed by a computing device and given the heterogeneous characteristics of such devices. The software application has then to be adapted for the characteristics of that device. The software application contains multiple components that are semantically related to each other; for example an image in one view being referred to in another view. (A "view" is a web page which is displayed back to the user in a web application). Another example is components which accept user inputs that may be very important to other components, as their behaviour would be dependant on the inputs. Therefore, any modification of a software application should carefully consider removal, updating or modification of components on which other components depend for correct functioning.

A known approach is translation or adaptation of the application components. This approach is widely used, however adapts the components one-by-one without taking care of the global semantics of the application. In this way, an element is modified without any related element being updated appropriately. For example, an image dropped in 'view 1' should lead to the reference to it being updated in 'view 2'. Since related elements are not updated at the adaptation of a given element, the applications generated as part of adaptation do not remain semantically consistent. This inconsistency may lead to malfunction of the application.

U.S. Pat. No. 5,561,803 (Kilis, issued on Oct. 1, 1996) describes incrementally processing a source representation of a set of objects into an intermediate representation. The object is to re-process only those objects which have been changed in some way when a modification is made. Each changed facet of a changed object is selected in turn for processing. If the selected changed facet affects the object itself, then the previous intermediate representation of the object is modified. If the selected changed facet affects objects referencing or being referenced by the first object, then the references to the first object are detached and the intermediate representation of the objects referencing or being referenced by the object are modified accordingly. If the selected changed facet modifies an attribute of other objects, then due to inter-relationships such as inheritance, etc., the change recursively propagates to the intermediate representations of the objects in the affected objects by repeating the propagating step for each of the affected objects until the attribute changes to each modified object have been propagated to all affected objects. Semantic checking is then performed on each of the objects changed.

It is an objective of the present invention to adapt applications taking into account device characteristics, while maintaining semantic and functional consistency.

SUMMARY

The adaptation precedence of an application (or order of adaptation of various components) is given as a directed acyclic graph (DAG), with each vertex being an atomic unit of adaptation, or a component which comprises of atomic units of adaptation. Each such component has an associated DAG specifying the order of adaptation with vertices as sub-components. Relations among sub-components and associated actions are stored as a table. The relations between sub-components of different components follow a set of constraints in order to be compatible relations. A linear order from the partial order is created as represented by the DAG and follows that order for adaptation of each component. Each component x is adapted atomically and then the table of relations is updated appropriately. As and when a component y is to be adapted, the table is looked-up and it is determined which relations and actions are to be enforced upon y while its adaptation is being executed. A new version of the application is the output at the end of the adaptation, which is semantically consistent with the given relations and actions.

DETAILED DESCRIPTION

Semantic Dependencies

Each software application 'A' consists of components. Each component in turn contains sub-components. Let each such component/sub-component at any level be called an element in the application. Inter-element dependencies exist based on semantics (function and operation). These inter-element dependencies can be intra-component or inter-component.

Semantic relationships between components exist at various levels. For example, let an application A consist of component C1, C2, ..., Cm. Let C1 consist of two sub-components S11 and S12. S12 consists of sub-sub-components SS121, SS122 and SS123. A software application developer could define each of these components and its contained components as elements. So each of C1, C2, S1, S2, S11, S12, SS121, SS122 and SS123 are defined as elements E1, ..., E9. A semantic dependency lies between SS121 and SS123 (as AND); that is, either both of them would exist or else none would exist in the application. In other words the functionality of SS121 and SS123 are dependant on each other's existence and/or correct operation. A semantic dependency lies between S11 and S12 that is one of implication, i.e. S11->S12. Implication puts a partial order among the elements, and also imposes a requirement that if S11 is there, then S12 must also be there.

Relationships

The relationships between (any two) elements are logical and binary. AND, OR, XOR, NAND, NOR, EQUIVALENCE, Implication (e.g. X->Y: if X then Y) are relationships which depend on the existence of one of the elements in the adapted application.

There is another kind of relationship between (X, Y) in which if X is removed or modified, or split, then Y needs to be "modified". This is called a Modify relationship. These binary relationships eventually have to be transformed into unary relationships. The unary relationships used are Keep and Drop. The Modify relationship is defined as follows:

Keep(X) Modify Y (Action) or
Drop(X) Modify Y (Action) or
Modify(X (ActionOnX)) Modify Y (Action).

A Keep/Drop/Modify relationship on X would lead to a Modify on Y with the specified Action on how to modify it. The "Action" is just a modification of the element; not a Drop of Y in any way.

The set of relationships is:

TABLE 1

| | |
|---|---|
| AND | (x AND y): x and y must be kept together. |
| XOR | (x XOR y): either of x and y must be kept, not both. |
| OR | (x OR y): either of x, y or both could be kept. |
| IMPLICATION | (x -> y): if x is kept, then y must be kept. |
| MODIFY | KEEP x Modify y (Action): A Keep/Drop/Modify on X would lead to a Modify on Y with the specified Action on how to modify it. The "Action" is just a modification of the element; not a Drop of Y in any way. |
| | Drop x Modify y (Action): |
| | Modify (x (ActionOnX)) Modify y (Action): |
| NAND | (x NAND y): at most one of them can be kept. |
| NOR | (x NOR y): x and y must be dropped together. |
| EQUIVALENCE | (x EQUIVALENCE y): x and y either be kept or dropped, but together each time. |

Overview

Figure 1:
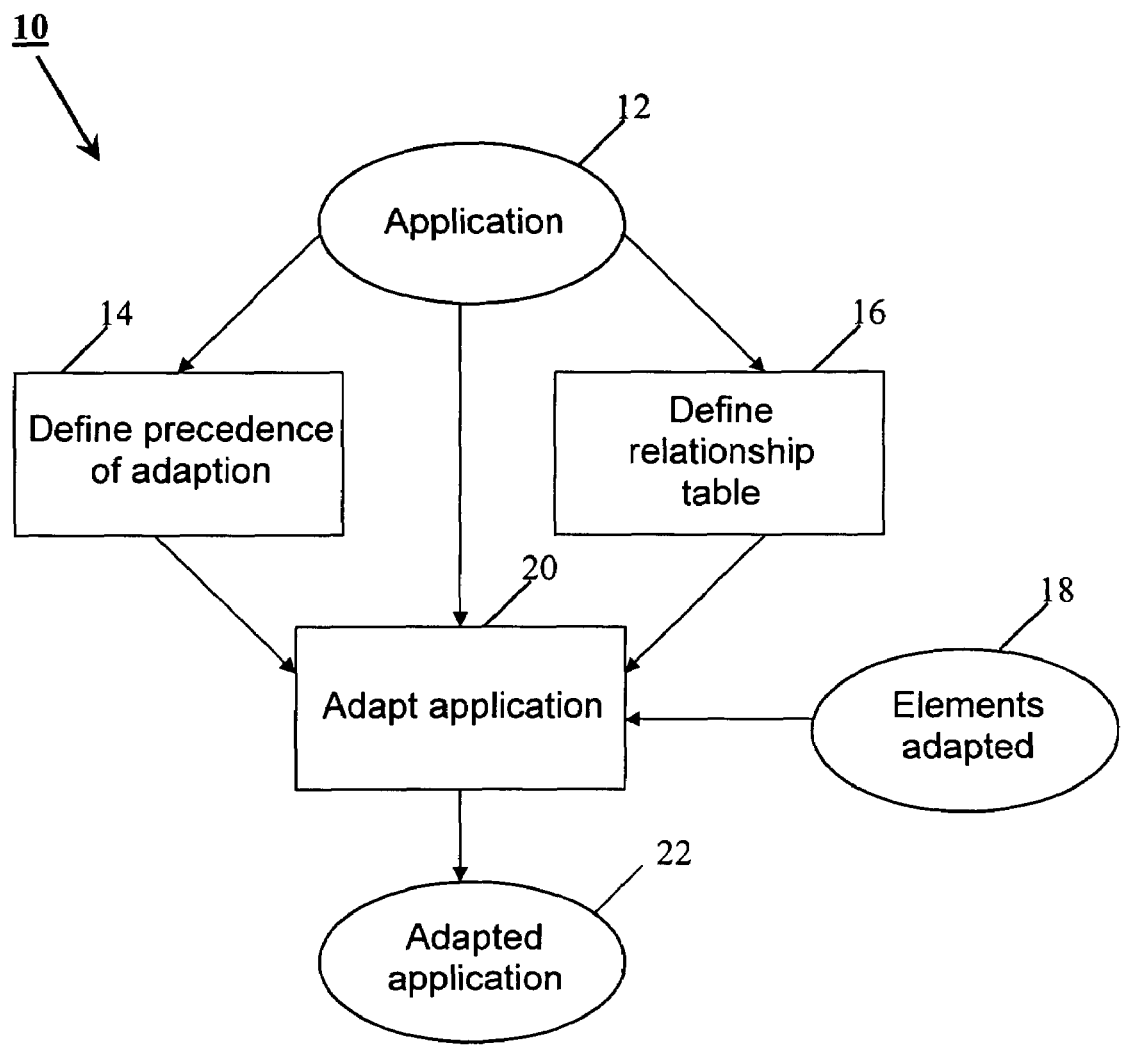
FIG. 1 is a block flow diagram of the run-time adaptation of elements of a software application.

Referring then to FIG. 1, a broad flow diagram of steps of a method 10 embodying the invention is shown. A software application 12 is given. From the application, the precedence of adaptation (step 14) of elements is defined. A relationship table of elements is also defined (step 16). In response to one or more elements being adapted (step 18), the application is adapted (step 20), drawing on the precedence and relationship table. This results in generation of an adapted form of the application 22.

These relationships between elements of a software application—upon which the precedence of adaptation and relationship table are based—are either automatically extracted using existing mining tools, or manually specified, or semi-automatically detected (i.e. some relationships are extracted automatically and remaining ones are specified by the software developer). An example of a suitable automatic mining tool is taught in a paper by Masahiro Hori et al, Annotation by Transformation for the Automatic Generation of Content Customization Metadata, published in F. Mattern and M. Naghshineh (Eds.): Pervasive 2002, LNCS 2414, pp. 267-281, 2002, the contents of which are incorporated herein by reference. This tool follows the annotation by transformation approach, and automatically generates content customization metadata on the basis of users' editing operations for the content customization. The tool keeps track of what is removed and what is preserved. Once such a database is created, one can use association rule mining to extract relationships among the various elements.

Specifically, Hori et al. describe that users are increasingly accessing the Internet from mobile devices as well as conventional desktop computers. However, it is not reasonable to expect content authors to create different data presentations for each device type, but the content source should be reused across multiple delivery contexts whenever possible. The objective of this research is to develop a supporting tool for the presentation customization that follows after the content specialization in device-independent authoring. This paper presents a tool that automatically generates content customization metadata on the basis of users' editing operations toward the desired results of the customization. A prototype of the metadata generator was developed for the generation of page-clipping annotations to be used for an annotation-based transcoding system.

In the case of new applications where editing history is not available, the developer has to specify the relationships as well as the order.

Once the relationships between elements of a software application are known, any adaptation (taking into account device, characteristics) must be handled such that semantic and functional consistency remains.

Precedence of Adaptation

Each software application's precedence of adaptation is represented as a directed acyclic graph (DAG). Each component having sub-components has such a DAG with the vertices as sub-components. This DAG represents partial order of their processing. Each vertex in this graph is a component in the application (or a sub-component in the container component). The software application will have components/elements that have to be adapted atomically (such as a web page in a web application). Such a component of an application is defined as a unit of adaptation. There is no DAG associated with such an element. This means that X is a component of an application provided any sub-component of X can only be adapted as part of the adaptation of X and not any other way. Each directed edge from x to y defines precedence relation on adaptation. That means x will be adapted earlier than the y.

Such a graph is based on a device or a collection of similar devices. The graph is specified by the software developer.

Relationship Table

There are relationships among the sub-components of the vertices of this graph recorded in a relationship table. Each entry in the table is a tuple: ((x, y), relation, action). The first entry in the tuple is a pair, if the relation is a binary relation or is a single entry if the relation is unary. The pair is on the elements. The relation is one of AND, XOR, OR, NAND, NOR, EQUIVALENCE, IMPLICATION, KEEP, DROP and MODIFY. The relations KEEP and DROP are unary relations. AND means the action field is null in the case of Boolean relations and KEEP and DROP. In a MODIFY relation, the action field includes the actions to be taken on y, in case of KEEP or DROP x or modification of x with respect to another action—ActionOnX (see Table 2).

The relationship table also contains a flag if a relation has already been accounted for or if the relation has to be applied as one of the entities have been adapted, or if the relation would never be applied (when all of these entries are not to be adapted at all). This flag is set appropriately during the process of adaptation. The actions over an element 'e' would be triggered if the element 'e' is modified such that such a modification leads to malfunction of all related elements of 'e' or leads to inconsistency in the semantics of all elements related to 'e'.

Compatible Relations

If a semantic dependency exists between components x and y, then sub-components of x and y could not have all possible relations between them due to compatibility constraints as described below.

The following table summarizes compatible dependencies.

TABLE 2

| Component x r1 Component y | Sub-component of x (h) r2 sub-component of y (t) | Sub-component of x (h) r3 component of y |
|---|---|---|
| r1: AND | r2: any relation | r3: h IMPLICATION y. |
| r1: XOR | r2: same XOR; i.e., if x survives as parent, then h would survive or else t. | r3: same XOR; i.e., if x survives as parent, then h would survive or else y. |
| r1: OR | r2: if x AND y, or x XOR y, follow the corresponding rules. | r3: if x AND y, or x XOR y, follow the corresponding rules. |
| r1: IMPLICA-TION | r2: if x AND y, then follow AND rule. if DROP x AND KEEP y, then drop h and keep t. | r3: if x AND y, then follow AND rule. if DROP x AND KEEP y, then drop h and keep y. |

EXAMPLE

Taking the case of a web application, a view in HTML (web page) is considered a component, a <TABLE> is a sub-component, a <TR> is a sub-sub-component, a <TD> is sub-sub-sub-component and a hyper link <href> is an element.

Figure 2:
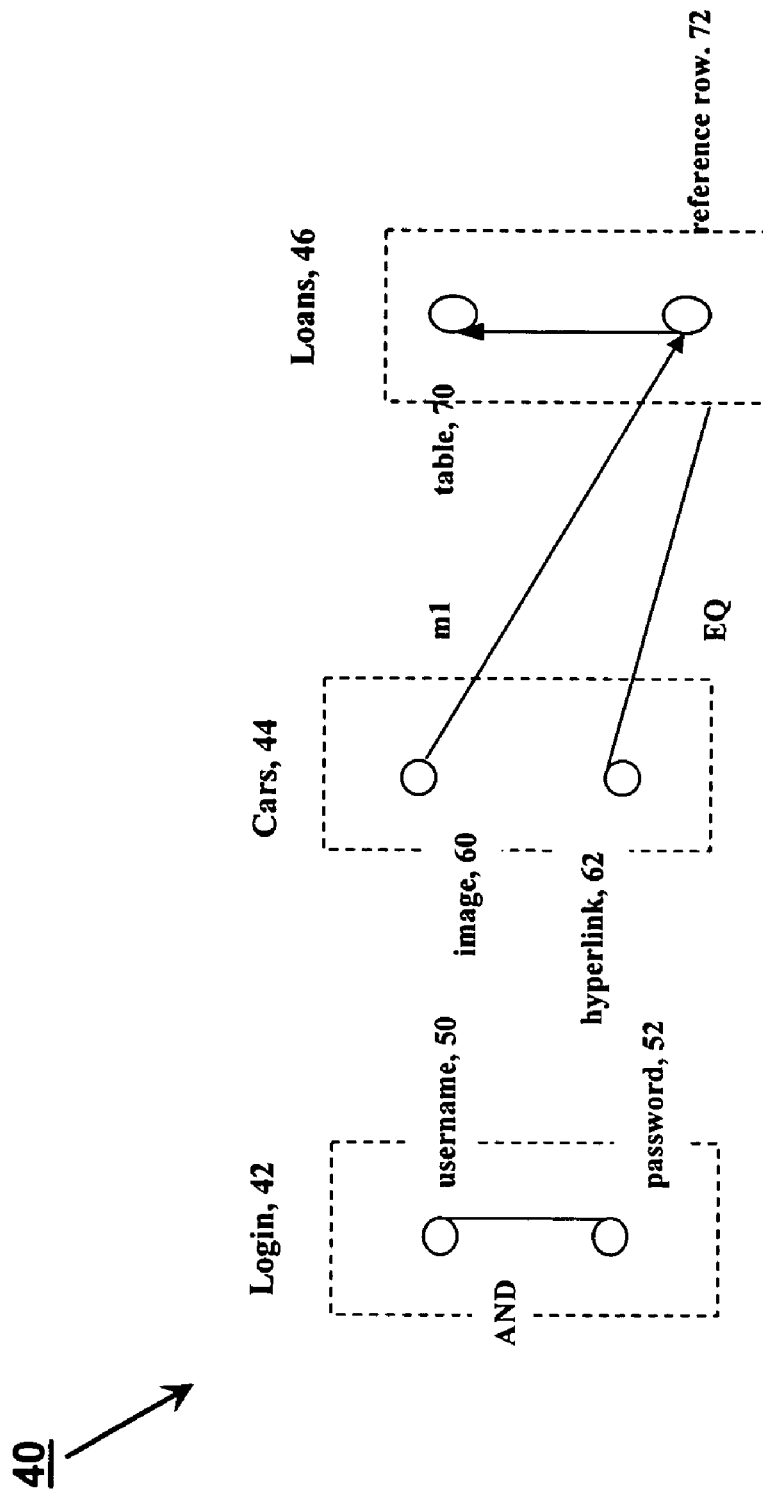
FIG. 2 is a schematic representation of an example application's components and relationships.

Referring now to FIG. 2, consider a banking application 40 embodying such a web application with three views: Login page 42, Cars page 44 and Loans page 46. The Login page 42 has two text fields <input> for user name 50 and password 52. The Cars page 44 lists an image of a car 60, a hyperlink 62 on that image to a Loans page 46. The Loans page 46 has references to the image 60 in the Cars page 44. There is additionally a table 70 of interest and premium rates with radio buttons (i.e. a group of choices in HTML code from which at most one can be selected by the user) for each in the Loans page 46. The table 70 also contains a row 72 containing a reference to the image 60.

An AND relationship exists between the username 50 and password 52 fields of Login page 42. An AND relationship exists between the hyperlink 62 in the Cars page 44 to the Loans page 46. A Modify relationship 'm1' exists in this manner: Drop (image in Cars page) Modify (Row of reference in Loans page) (Remove the reference to the image in the text). The last clause is an "Action". The reference row 72 in the table 70 within the Loans page 46 has an implication relation to the table itself.

Figure 3:
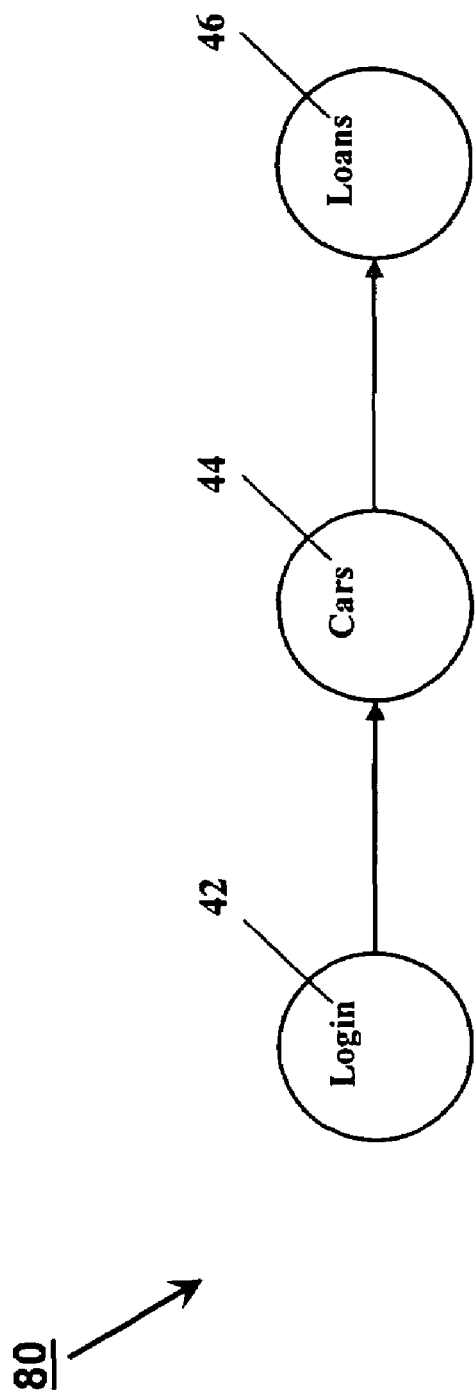
FIG. 3 is a schematic representation of a precedence of adaptation.

In the precedence graph (DAG) 80 shown in FIG. 3, the Login page 42 would be adapted before the Cars page 44 and the Loans page 46.

The relationship table for this example is as follows. (Each element is qualified by prefixing with the name of the component (page) with the delimiter'.').

TABLE 3

| Flag | Elements | Relation | Action |
|---|---|---|---|
| Not applied | (Login.username, Login.password) | AND | |
| Not applied | (Cars.hyperlink, Loans) | EQUIVALENCE | |
| Not applied | (Cars.image, Loans.reference row) | MODIFY DROP Cars.image MODIFY Loans.reference row (Action) | Remove textual reference to image. Update the text. |
| Not applied | (Loans.reference row, Loans.table) | IMPLICATION | |
| Not applied | (Login, Cars) | AND | |
| Not applied | (Cars, Loans) | AND | |

Adaptation

The adaptation process is suitable for both static and run-time adaptation. The "actions" are separate to the "adaptations". The result of all the actions is not the adaptation of the application, but enforcement of the semantic relations of the application.

Each component within the relationship table that is not an atomic unit of adaptation has a DAG associated with it involving its sub-components. There is a relationship table for the whole application. Even though the ultimate elements who do not have a DAG associated with them, they can have sub-elements which are involved in rules with other sub-elements or components. An algorithm recursively applies the relationship rules to each sub-component of a component in the order specified by the DAG for the component until it reaches a sub-component that is an atomic unit of adaptation. The algorithm then invokes an adaptation technique that incorporates evaluation of relationship rules for the inner elements of this sub-component while doing the adaptation.

Algorithm

The algorithm specifies what must be done during adaptation in order to maintain the relationships.

INPUT: Adaptation Precedence graph G for A, Relationship table T, Application A

OUTPUT: Adapted application with semantic consistency

Steps:

Process (G, T, A)
1. For each vertex 'v' in G such that 'v' does not have any incoming edge do
2. Decision on 'v' and set of MODIFY rules=Evaluate rules for 'v' from T.
3. If (Decision on 'v' is DROP) process next vertex.
4. Else If ('v' is a component to be adapted atomically)
   a. Decision on 'v'=Semantically adapt 'v'
5. Else
   a. Apply the actions on 'v' from the set of MODIFY rules returned through evaluate rules in step 2.
   b. G'=precedence graph for 'v'
   c. Decision on 'v'=Process (G', T, v)
6. If (Decision on 'v' is not DROP) and (all sub-components of 'v' are assigned DROP)
   a. Decision on 'v'=DROP
7. If (Decision on 'v' is not KEEP nor DROP, i.e. value could be any of these)
   a. Use device memory or screen size or other parameters alone or together to decide on the value of Decision on 'v'.
   b. If device characteristics are not available, then choose to KEEP.
8. Update rules in T for 'v' using Decision on 'v'.
9. Remove 'v' from G. This removes the outgoing edges from 'v' from G.

Evaluate Rules ('v', T)
1. Find Boolean rules from T that involves 'v'
2. Use the values of KEEP or DROP of other entries in these rules
3. Solve the set of Boolean equations for 'v'

4. Return the value of the solution as "Decision on v" as well as the set of rules for "MODIFY v".

Update rules ('v', T, Decision on 'v')
1. Set value of 'v' in all rules that contain 'v' to Decision on 'v'
2. Mark rules that have been completely applied as Applied Semantically Adapt ('v')
1. Use specified adaptation technique specific to the technology of 'v' to adapt 'v'
2. If element 'e' is encountered during the process of adaptation,
   a. Evaluate rules for 'e' in 'T'.
   b. If Decision on 'e' is DROP then drop 'e' and continue to next element for adaptation.
   c. If Decision on 'e' could be either KEEP/DROP then decide using device characteristics to KEEP or DROP 'e' or else choose to KEEP.
   d. Continue adaptation to KEEP 'e'
   e. Update rules for 'e' in T.
3. Return Decision on 'e' as KEEP or DROP, as decided above.

Algorithm Applied to the Example

Applying algorithm to the foregoing example, referring particularly to Table 3. Login 42 is the component with no incoming edge. The first relation needs to be applied to it. When username 50 is getting adapted, then mark the relation "to be applied" in S and T. When password 52 is to be adapted, then apply this relation AND. Since username is KEPT, password has also to be KEPT. Mark the relation to be "Applied". At the end of adaptation of Login 42, remove the outgoing edge of Login and remove it from the graph. Similarly continue adapting the Cars page 44 and the Loans page 46.

Applications

A specific application of the processes describe is in view adaptation, such as an image or a structure being dropped or transformed to another format such as text. Additionally, optional form controls (<input> . . . ) could be removed if they are not being used by other views. This would reduce the size of the view for specific devices accessing the application. A benefit is that the number of data validation method invocations is minimised, which improves application performance through code size and through latency. Page splitting of the view is also possible using the relationships between elements. This allows logical boundaries to be detected more efficiently. Yet further, multiple portlet pages on a portal server can be updated based on actions that are synchronised with the relationships between the portlets.

A further specific application is the adaptation of software components or objects other than views. This can be performed statically or dynamically. If a software component such as an object is being removed, then related components need to be updated accordingly.

Computer Hardware

Figure 4:
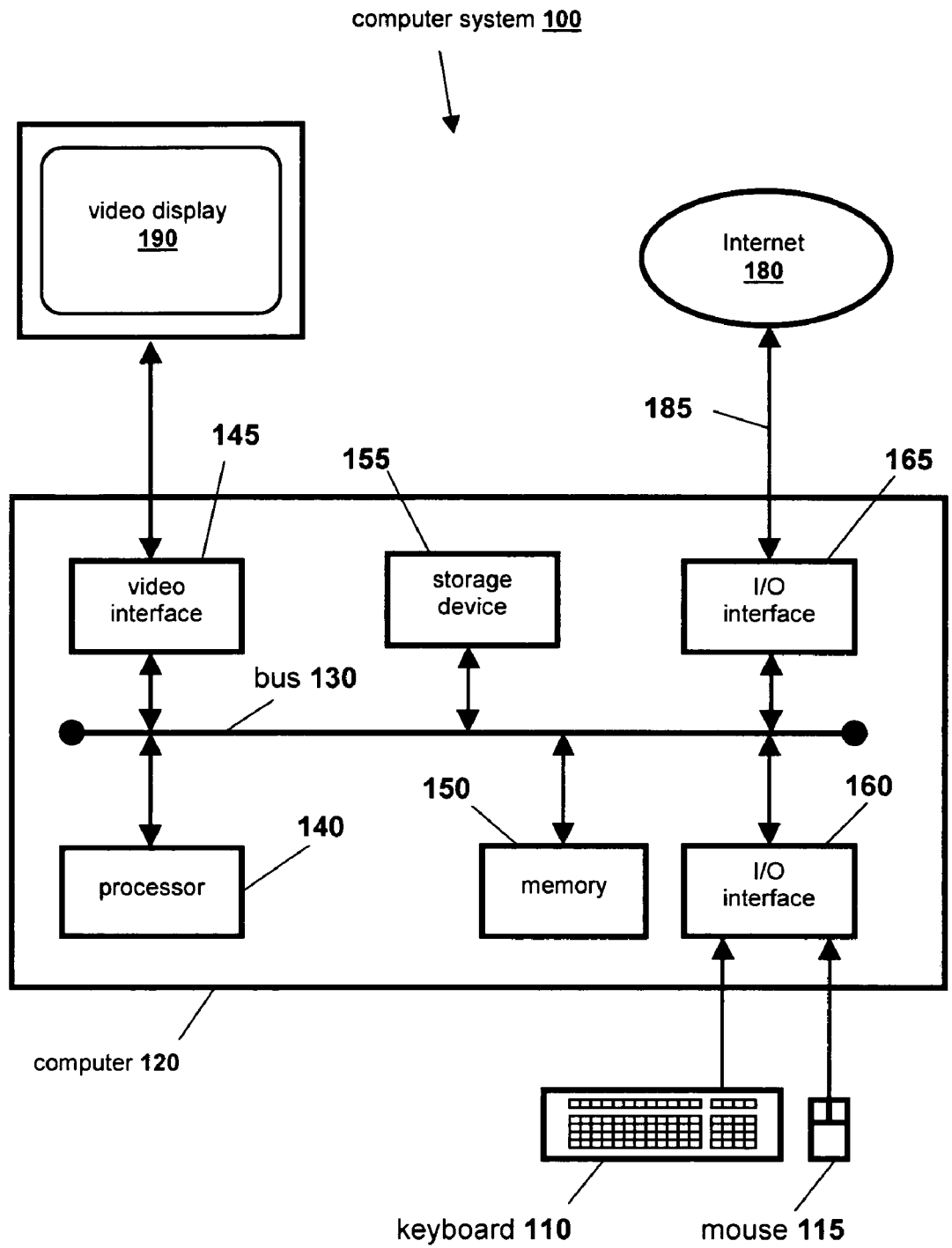
FIG. 4 is a schematic representation of a computer system suitable for performing the techniques described herein.

FIG. 4 is a schematic representation of a computer system 100 of a type that is suitable for executing computer software for the semantically consistent adaptation of applications. Computer software executes under a suitable operating system installed on the computer system 100, and may be thought of as comprising various software code means for achieving particular steps.

The components of the computer system 100 include a computer 120, a keyboard 110 and mouse 115, and a video display 190. The computer 120 includes a processor 140, a memory 150, input/output (I/O) interfaces 160, 165, a video interface 145, and a storage device 155.

The processor 140 is a central processing unit (CPU) that executes the operating system and the computer software executing under the operating system. The memory 150 includes random access memory (RAM) and read-only memory (ROM), and is used under direction of the processor 140.

The video interface 145 is connected to video display 190 and provides video signals for display on the video display 190. User input to operate the computer 120 is provided from the keyboard 110 and mouse 115. The storage device 155 can include a disk drive or any other suitable storage medium.

Each of the components of the computer 120 is connected to an internal bus 130 that includes data, address, and control buses, to allow components of the computer 120 to communicate with each other via the bus 130.

The computer system 100 can be connected to one or more other similar computers via a input/output (I/O) interface 165 using a communication channel 185 to a network, represented as the Internet 180.

The computer software may be recorded on a portable storage medium, in which case, the computer software program is accessed by the computer system 100 from the storage device 155. Alternatively, the computer software can be accessed directly from the Internet 180 by the computer 120. In either case, a user can interact with the computer system 100 using the keyboard 110 and mouse 115 to operate the programmed computer software executing on the computer 120.

Other configurations or types of computer systems can be equally well used to execute computer software that assists in implementing the techniques described herein.

Conclusion

A number of advantages arise in practice of embodiments of the invention. Firstly, there are no unnecessary application elements. Secondly, program performance and user interface is improved. Thirdly, user-defined or pre-defined consistency is maintained. Fourthly, functionally correct applications are generated.

Various alterations and modifications can be made to the techniques and arrangements described herein, as would be apparent to one skilled in the relevant art.

We claim:

1. A method for semantically adapting a software application to a device having specific constraint rules, said method comprising:
   (a) inputting a precedence of semantic adaptation of components of said software application, as a directed acyclic graph (DAG), where vertices correspond to said components and directed edges indicate order of precedence;
   (b) inputting a relationship table, each entry of said relationship table corresponding to one of said components/vertices of said DAG, wherein each entry in said relationship table includes:
      a pair of subcomponents having a binary relation or a single component having a unary relation;
      a relation comprising one of AND, XOR, OR, NAND, NOR, Equivalence, Implication, KEEP, DROP, and MODIFY,
         wherein said binary relation comprises one of AND, XOR, OR, NAND, NOR, Equivalence, and Implication,
         wherein said unary relation comprises one of KEEP and DROP; and an action, wherein in said MODIFY relation, said
action includes actions taken on a second sub-component, in cases of KEEP or DROP of a first sub-component, or on said MODIFY relation of said first sub-component;
(c) for each vertex in said DAG not having an incoming edge, evaluating rules for a vertex according to said relationship table,
wherein said evaluate rules comprises:
solving Boolean relations of said subcomponents or:
in said cases of KEEP or DROP, acting on said second sub-component according to said MODIFY relation;
(d) returning said evaluate rules to said vertex;
(e) if said evaluate rules for said vertex is DROP, then processing a next vertex of said DAG; if said evaluate rules for said vertex is not DROP, then semantically adapting said vertex,
wherein said semantic adaptation is specific to device constraint rules of memory size or screen size linked to a specific component, and if said specific component corresponds to said vertex being semantically adapted, then KEEPing or DROPing said specific component according to said device constraint rules and returning said specific component as KEEP or DROP to said vertex; if said specific component corresponds to said vertex not being semantically adapted, then applying an action to said vertex from said MODIFY rules and repeating said evaluate rules to produce an updated DAG;
(f) updating all specific components/vertices in said updated DAG, as said returned KEEP or DROP;
(g) removing said returned DROP components/vertices from said updated DAG;
(h) continuing evaluating all components/vertices of said updated DAG, until said all components/vertices are removed for said evaluating; and
(i) using said evaluated components/vertices of said updated DAG to produce a semantically adapted software application specific to said device constraint rules.

2. A program storage device readable by machine, tangibly embodying a program of instructions executable by said machine to perform a method for semantically adapting a software application to a device having specific constraint rules, said method comprising:
(a) inputting a precedence of semantic adaptation of components of said software application, as a directed acyclic graph (DAG), where vertices correspond to said components and directed edges indicate order of precedence;
(b) inputting a relationship table, each entry of said relationship table corresponding to one of said components/vertices of said DAG, wherein each entry in said relationship table includes:
a pair of subcomponents having a binary relation or a single component having a unary relation;
a relation comprising one of AND, XOR, OR, NAND, NOR, Equivalence, Implication, KEEP, DROP, and MODIFY,
wherein said binary relation comprises one of AND, XOR, OR, NAND, NOR, Equivalence, and Implication,
wherein said unary relation comprises one of KEEP and DROP; and
an action wherein in said MODIFY relation, said action includes actions taken on a second sub-component, in cases of KEEP or DROP of a first sub-component, or on said MODIFY relation of said first sub-component;
(c) for each vertex in said DAG not having an incoming edge, evaluating rules for a vertex according to said relationship table,
wherein said evaluate rules comprises:
(i) solving Boolean relations of said subcomponents or;
(ii) in said cases of KEEP or DROP, acting on said second sub-component according to said MODIFY relation;
(d) returning said evaluate rules to said vertex;
(e) if said evaluate rules for said vertex is DROP, then processing a next vertex of said DAG; if said evaluate rules for said vertex is not DROP, then semantically adapting said vertex,
wherein said semantic adaptation is specific to device constraint rules of memory size or screen size linked to a specific component, and if said specific component corresponds to said vertex being semantically adapted, then KEEPing or DROPing said specific component according to said device constraint rules and returning said specific component as KEEP or DROP to said vertex; if said specific component corresponds to said vertex not being semantically adapted, then applying an action to said vertex from said MODIFY rules and repeating said evaluate rules to produce an updated DAG;
(f) updating all specific components/vertices in said updated DAG, as said returned KEEP or DROP;
(g) removing said returned DROP components/vertices from said updated DAG;
(h) continuing evaluating all components/vertices of said updated DAG, until said all components/vertices are removed for said evaluating; and
(i) using said evaluated components/vertices of said updated DAG to produce a semantically adapted software application specific to said device constraint rules.

3. A computer system for semantically adapting a software application to a device having specific constraint rules, said system comprising:
(a) a memory for storing a precedence of semantic adaptation of components of said software application, as a directed acyclic graph (DAG), updated DAGs, a relationship table, and updated relationship tables,
wherein vertices of said DAG or said updated DAGS correspond to said components and directed edges indicate order of precedence,
wherein each entry of said relationship table corresponds to one of said components/vertices of said DAG, wherein each entry in said relationship table includes:
(i) a pair of subcomponents having a binary relation or a single component having a unary relation;
(ii) a relation comprising one of AND, XOR, OR, NAND, NOR, Equivalence, Implication, KEEP, DROP, and MODIFY,
wherein said binary relation comprises one of AND, XOR, OR, NAND, NOR, Equivalence, and Implication,
wherein said unary relation comprises one of KEEP and DROP; and
(iii) an action,
wherein in said MODIFY relation, said action includes actions taken on a second sub-component, in cases of KEEP or DROP of a first sub-component, or on said MODIFY relation of said first sub-component; and (b) a processor that:
  (i) for each vertex in said DAG not having an incoming edge, evaluates rules for a vertex according to said relationship table,
    wherein said evaluate rules comprises:
      solving Boolean relations of said subcomponents, or in said cases of KEEP or DROP, acting on said second sub-component according to said MODIFY relation;
  (ii) returns said evaluate rules to said vertex;
  (iii) if said evaluate rules for said vertex is DROP, then processes a next vertex of said DAG; if said evaluate rules for said vertex is not DROP, then semantically adapts said vertex,
    wherein said semantic adaptation is specific to device constraint rules of memory size or screen size linked to a specific component, and if said specific component corresponds to said vertex being semantically adapted, then KEEPing or DROPing said specific component according to said device constraint rules and returning said specific component as KEEP or DROP to said vertex; if said specific component corresponds to said vertex not being semantically adapted, then applies an action to said vertex from said MODIFY rules and repeats said evaluate rules to produce an updated DAG;
  (iv) updates all specific components/vertices in said updated DAG, as said returned KEEP or DROP;
  (v) removes said returned DROP components/vertices from said updated DAG;
  (vi) continues evaluating all components/vertices of said updated DAG, until said all components/vertices are removed for said evaluating; and
  (vii) uses said evaluated components/vertices of said updated DAG to produce a semantically adapted software application specific to said device constraint rules.

* * * * *